United States Patent
Kay (10) Patent No.: US 8,082,458 B2
(45) Date of Patent: Dec. 20, 2011

(54) CONFIGURING AN OPERATING STATE OF A TERMINAL DEVICE

(75) Inventor: William Kevin Kay, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 466 days.

(21) Appl. No.: 12/269,431

(22) Filed: Nov. 12, 2008

(65) Prior Publication Data

US 2010/0122098 A1    May 13, 2010

(51) Int. Cl.
*G06F 1/32* (2006.01)
(52) U.S. Cl. ........................ 713/320; 713/324
(58) Field of Classification Search .............. 713/300, 713/310, 323, 324, 340; 709/217–219
See application file for complete search history.

(56) References Cited

U.S. PATENT DOCUMENTS

| | | | |
|---|---|---|---|
| 5,404,355 A * | 4/1995 | Raith | 370/311 |
| 6,058,289 A * | 5/2000 | Gardner et al. | 340/7.32 |
| 6,192,230 B1 * | 2/2001 | van Bokhorst et al. | 455/343.3 |
| 6,622,251 B1 * | 9/2003 | Lindskog et al. | 713/300 |
| 6,848,059 B2 * | 1/2005 | Bullman et al. | 713/323 |
| 7,251,736 B2 * | 7/2007 | Dayan et al. | 713/310 |
| 7,523,329 B2 * | 4/2009 | Ezra et al. | 713/320 |
| 2005/0223248 A1 * | 10/2005 | Lim et al. | 713/300 |
| 2006/0075269 A1 * | 4/2006 | Liong et al. | 713/300 |
| 2007/0076683 A1 * | 4/2007 | Chung et al. | 370/350 |

* cited by examiner

*Primary Examiner* — Raymond Phan
(74) *Attorney, Agent, or Firm* — Merchant & Gould (57) ABSTRACT

Techniques are described herein for achieving network-based wake-up functionality for power management functions using a standard network controller for embedded applications. A network controller is configured to receive packets sent via a network and to respond to the packets depending on a destination media access control (MAC) address contained in the packets. A processor coupled to the network controller configures an operational MAC address for network traffic that the network controller is responsive to based on an operating state.

20 Claims, 5 Drawing Sheets

CONFIGURING AN OPERATING STATE OF A TERMINAL DEVICE

TECHNICAL FIELD

The present disclosure relates to network-based wake-up functions for embedded devices.

BACKGROUND

A network-based "wake-up" capability for computing devices and embedded devices is known and used in the computing industry. The mechanism involves powering up or otherwise bringing a device out a standby low power mode by sending a special packet over a network to the device. A special hardware component in a network controller within the device is needed to respond to the special packet. The hardware component in the network controller searches for the special packet while the device is in a low power mode. In order to remotely wake-up the device, the network controller needs to remain active.

Network controllers available for certain embedded computing device applications (e.g., a set-top box for use in a video distribution system) do not directly support the aforementioned special packet wake-up function. An alternative network-based wake-up function is needed to meet emerging power use requirements and standby power modes for computing applications.

DESCRIPTION OF EXAMPLE EMBODIMENTS

Overview

Techniques are described herein for achieving network-based wake-up functionality for power management functions using a standard network controller for embedded applications. The network controller is configured to receive packets sent via a network and to respond to the packets depending on a destination media access control (MAC) address contained in the packets. A processor coupled to the network controller configures an operational MAC address for network traffic that the network controller is responsive to based on an operating state.

Figure 1:
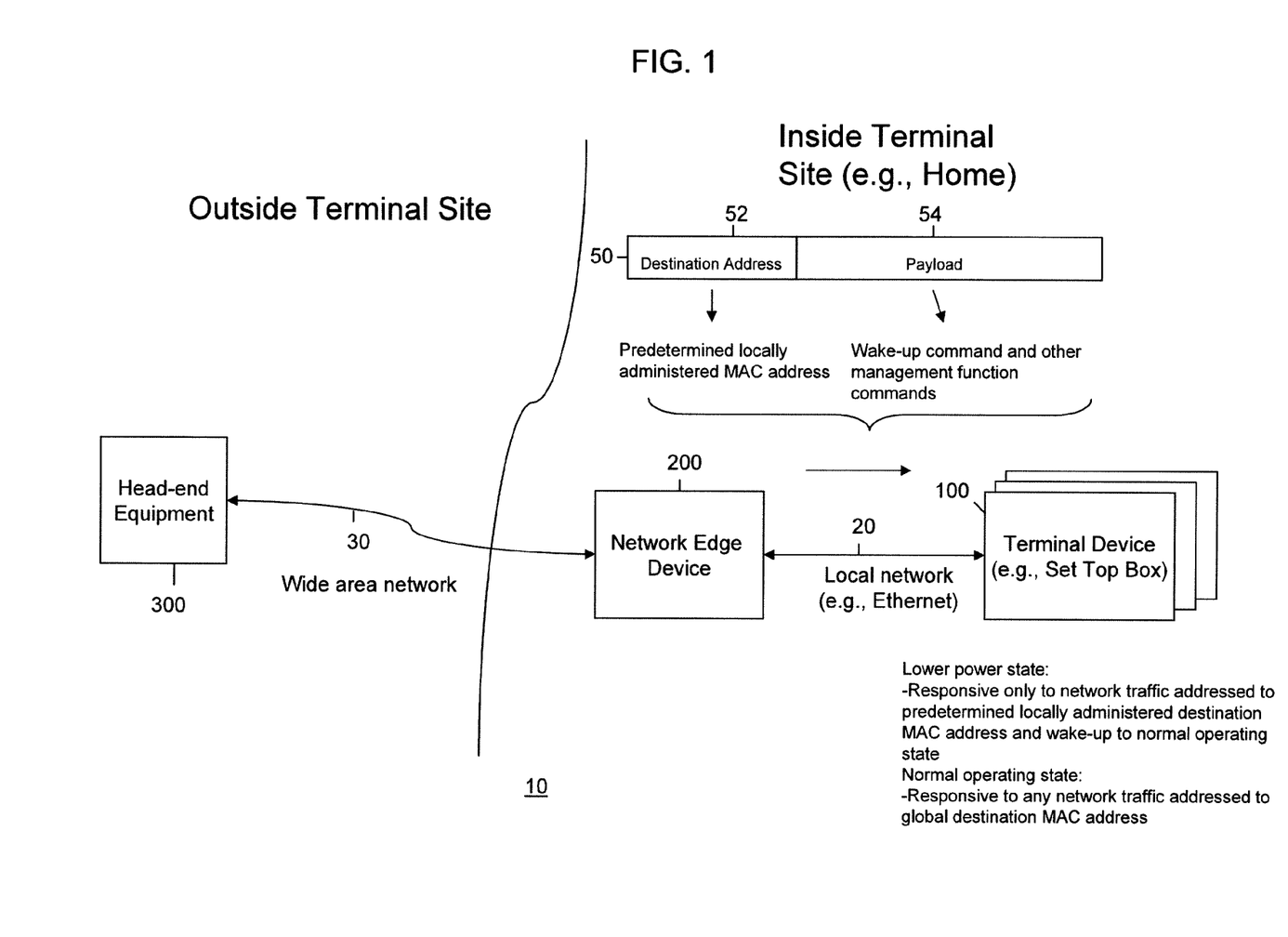
FIG. 1 is a diagram of a system in which a terminal device is configured to have network-based wake-up capabilities without the use of a specially designed network controller chip.

Referring first to FIG. 1, a system 10 is shown comprising a user terminal 100, a network edge device 200 and head-end equipment 300. The system 10 is, for example, a system that distributes data from the head-end equipment 300 to a plurality of terminal devices. The terminal devices are, for example, set-top box (STB) devices that are used for receiving the data and presenting it to users in the form of video programming services (television, movies, games, etc.). To this end, the terminal device 100 has data processing capabilities to receive, store and present the data received from the head-end equipment 300.

The terminal devices 100 may be connected to a local (area) network (LAN) 20, such as within a home or business environment. The network edge device 200 is also connected to the local area network 20. The head-end equipment 300 connects to a wide area network 30 (e.g., the Internet or a service provider content delivery network) as does the network edge device 200. The network edge device 200 thus serves as interface between the wide area network 30 and the local area network 20 for the user terminal 100. A single terminal device 100 is referenced in FIG. 1 for simplicity though it is understood that there may be multiple terminal devices 100 connected to the local area network 20, and multiple LANs each at different terminal sites and comprising one or more terminal devices connected thereto.

The terminal device 100 is responsive to network traffic so long as the network traffic is addressed to the global media access control destination (MAC) address of the terminal device 100. This is desirable under normal operating states of the terminal device 100. The terminal device 100 may enter a low power operating state when it is not being used or certain functions of it are not needed, thereby reducing power consumption of the device. There are times, however, when it is necessary to wake-up the terminal device 100 for administrative or management functions by way of a command that originates at the head-end equipment 300 or general housekeeping functions like a "health check" originating from the network edge device 200.

To this end, the terminal device 100 is configured to wake-up in response to receiving a network packet that is addressed to a predetermined locally administered destination MAC address that is unique to the terminal device 100. FIG. 1 illustrates an example of such a packet 50 and this packet is sent by the network edge device 200 to the terminal device 100. The packet 50 that contains an address field 52 and a payload field 54. There may be numerous other fields in the packet 50, but for simplicity those fields are not shown and described herein because they do not pertain to the techniques described herein. The address field 52 is populated with the predetermined locally administered MAC address for which the terminal device 100 is configured to respond to when in a low power state. The payload field 54 of packet 50 may contain any command (or no command). For example, the payload field 54 may simply include a wake-up command such that subsequently received packets sent by the head-end equipment 300 and received by the terminal device 100 via the network edge device 200 are processed by the terminal device 100 in a normal operating state. In another example, the payload field 54 of packet 50 may contain a particular management or administrative function command. For example, the headend equipment 300 may send a command that the network edge device 200 receives, where the command is intended to wake-up the terminal device 100 in order to perform management functions such as firmware updates, statistics gathering, etc. Each individual terminal device in the system 10 has a unique global destination MAC address and also a unique locally administered destination MAC address. The network edge device 200 knows the method used to derive the locally administered destination MAC address so that when the wake-up command is sent by the head-end equipment 30, the network edge device 200 knows how to wake-up the terminal device 100 using a packet such as packet 50 described above. The derivation method for the locally administered destination MAC address used by network edge device 200 agrees with (is the same as) the derivation method used by terminal device 100 so the same resulting local administered MAC address can be reliably determined.

When in the low power state and the terminal device 100 receives a packet addressed to the locally administered destination MAC address, the terminal device 100 will wake-up and switch to another operating state, such as the normal operating state, so that it may perform various normal operating functions. When in the normal operating state, the terminal device 100 is configured to respond to any traffic that is addressed to the global destination MAC address for the terminal device 100.

Thus, the network-based wake-up configuration shown in FIG. 1 does not require a specialized network controller in the terminal device 100. The terminal device 100 may use a standard network controller for embedded applications that does not require additional specialized hardware for recognition of special wake-up packets.

Figure 2:
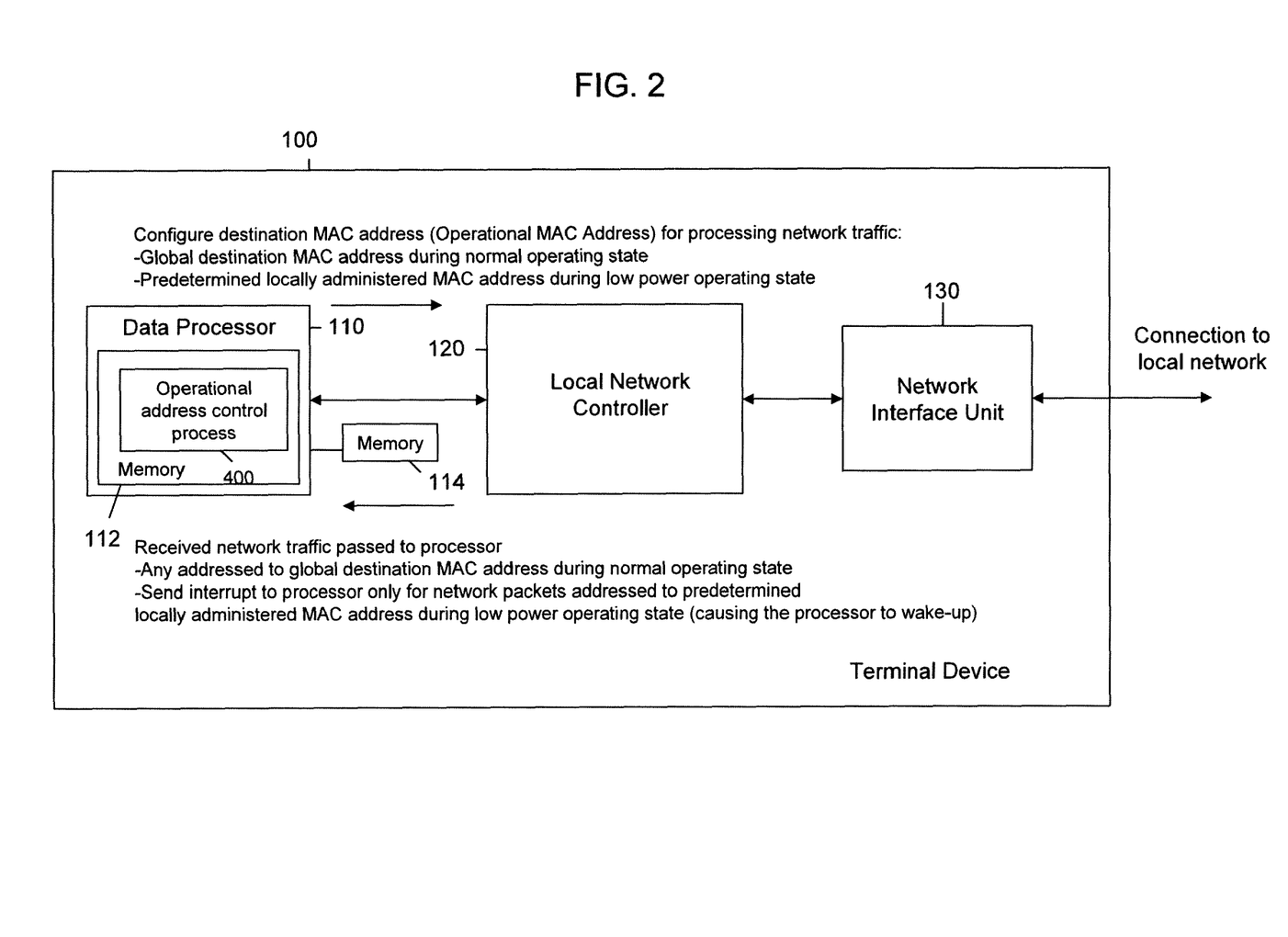
FIG. 2 illustrates a block diagram of a terminal device that is configured to perform an operational media access control (MAC) address control process that supports network-based wake-up capabilities.

Turning now to FIG. 2, the terminal device 100 is shown in greater detail to explain how it is configured to perform the network-based wake-up function generally described above in connection with FIG. 1. The terminal device 100 comprises, among other components not pertinent to the techniques described herein, a data processor 110, a local network controller 120 and a network interface unit 130. The data processor 110 may be a microprocessor, microcontroller, etc., and comprises internal memory 112. Logic instructions for an operational address control process 400 may be stored in the internal memory 112, and when executed by the processor 110, cause the processor to perform the operational address control process 400 described herein, and in more detail hereinafter in connection with FIG. 5. Working data and instructions for other processes performed by the processor 110 may be stored in an external memory 114. The external memory 114 stores data and instructions associated with functions of the terminal device only during the normal operating state, whereas the internal memory 112 stores data and instructions associated with functions of the terminal device during the normal operating state and the low power operating state. The local network controller 120 is, for example, a standard Ethernet controller, and it need not require any specialized hardware that is required for other network-based wake-up functions. The network interface unit 130 provides physical (PHY) layer processing and interfacing of packets to and from the local network 20 (FIG. 1) for the terminal device 100.

The processor 110 executes the operational address control process 400 to configure the operational MAC address of the local network controller 120 in the terminal device 100. The operational MAC address of the terminal device 100 is the MAC address that the local network controller 120 will respond to when receiving network packets. The processor 110 programs or otherwise configures the local network controller 120 to respond to network traffic addressed to the global destination MAC address by setting the operational MAC address of the local network controller 120 to the global destination MAC address during a normal operating state of the terminal device 100. On the other hand, the processor 110 programs or otherwise configures the local network controller 120 to respond to the predetermined locally administered MAC address by setting the operational MAC address of the local network controller to the locally administered destination MAC address during the low power operating state of the terminal device 100. Thus, depending on the operating state of the terminal device 100 as managed by the processor 110, the processor 110 switches the operational destination MAC address for which the network controller 120 will respond to network traffic that is directed to the terminal device 100. Consequently, the local network controller 120 passes local network traffic (and any accompanying interrupts) to the processor 110 depending on which destination MAC address the local network controller 120 is configured to respond to. When the terminal device is in the normal operating state, the local network controller 120 passes to the processor 110 any network traffic (and associated interrupts) that are addressed to the global destination MAC address or a broadcast MAC address (broadcast or multicast). When the terminal device 100 is in the low power operating state, the local network controller 120 passes network traffic and any appropriate interrupts to the processor 110 only when the network traffic is addressed to the predetermined locally administered MAC address, thereby causing the processor to wake-up from its low power state. All other network traffic (addressed to the global destination MAC address or a broadcast MAC address for the local broadcast domain of the terminal device) received during the low power state is ignored In one example, the predetermined locally administered MAC address is derived directly from the standard global destination MAC address of the terminal device by setting at least one bit, e.g., the "locally administered" bit in the organizationally unique identifier (OUI) field of the global MAC address to a predetermined value. For example, if the factory assigned destination MAC address is 00-18-68-00-00-01, then the locally administered MAC address is 02-18-68-00-00-01. The predetermined locally administered MAC address is unique inside the local broadcast domain because the corresponding global MAC address is also unique inside that local broadcast domain. Generally speaking, the network edge device 200 would be the only network entity aware of the MAC address change, how the operational MAC address is changed and the mechanism for waking the terminal device. Thus, both the network edge device 200 and the terminal device 100 know how, and as described hereinafter, when the operational MAC address is changed for any given terminal device. The local network controller 120 will also not respond to any and all broadcast traffic in the local domain when it is configured to use the locally administered MAC address as the operational MAC address.

This change of destination MAC address prevents the terminal device 100 from falsely waking up in response to residual network traffic directed to the terminal device 100, while allowing the terminal device 100 to be uniquely addressed within the terminal device's local network by the network edge device 200. As explained hereinafter, the terminal device may send a status message to the network edge device 200 and subsequently to the headend device 300 to acknowledge that the terminal device 100 is entering the low power state so this could be tracked. Thus, the network edge device 200 knows when it needs to send network traffic to the locally administered MAC address for any given terminal device in order to wake-it up from a low power state. All terminal devices have a unique locally administered MAC address, but the network edge device 200 knows how and when each terminal device configures its local network controller to its locally administered MAC address.

As explained further hereinafter, there are many events that may cause the terminal device to go into its low power state (also referred to herein as a passive standby state) including a user command, expiration of an internal activity timer or a low power command from the headend equipment. In the low power state, all "unnecessary" functions are either poweredoff or placed into a low power mode. The core clock(s) in the processor 110 are either stopped or switched to lower frequencies. External memory 114 in the terminal device 100 is placed into a low power state (e.g., self-refresh mode for double data rate memory) and is not used. This is in contrast to the internal memory 112 that the processor 110 can use for executing special programs such as the operational address control process 400 A certain group of processor interrupts are kept active so that the terminal device 100 can be brought out of the low power state by a user or through the network-based wake-up command described herein.

Figure 3:
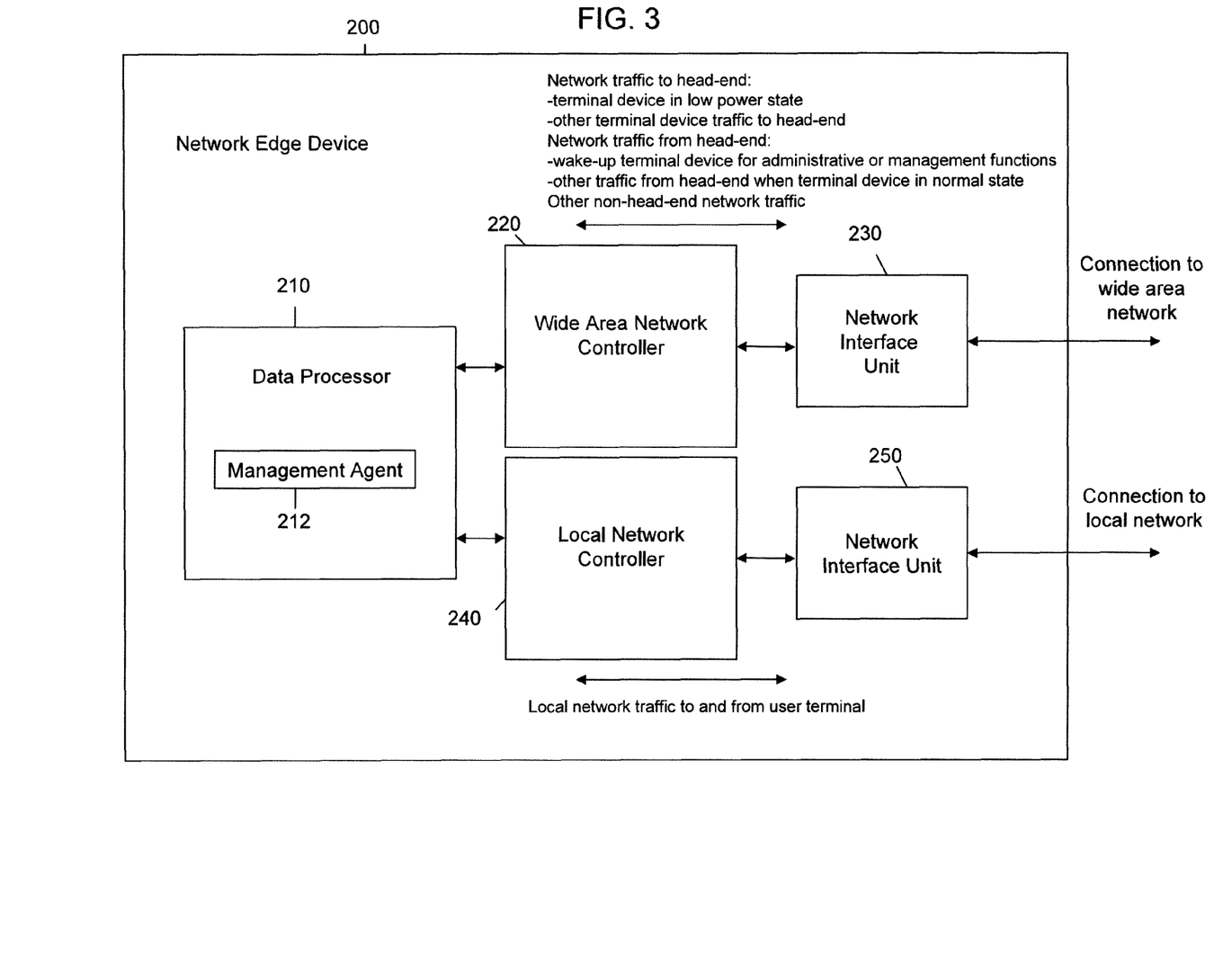
FIG. 3 illustrates a network edge device that is coupled to the terminal device by a local network and is in turn connected to a wide area network.

Turning to FIG. 3, the network edge device 200 is described in further detail. The network edge device 200 comprises a data processor 210, a wide area network controller 220, a wide area network interface unit 230, a local network controller 240 and a local network interface unit 250. The network edge device 200 serves as an interface between the local network 20 and the wide area network 30. Thus, the wide area network controller 230 passes wide area network traffic between the processor 210 and the wide area network via the wide area network interface unit 230. For example, the wide area network controller 220 passes network traffic to the headend equipment 300, such as messages indicating that the terminal device 100 is in a low power state, or other messages indicating the status of the terminal device 100. In the other direction, the wide area network controller 220 passes network traffic from the wide area network 20, including network traffic from the headend equipment 300, such as a network-based wake-up command for management or administrative functions and other headend network traffic. The wide area network traffic is routed using, for example, internet protocol (IP) packet routing techniques that are commonly used on the Internet. Network traffic on the wide area network may also originate from sources other than the headend equipment 300. Similarly, the local network controller 240 passes local network traffic associated with the terminal device 100 between the processor 210 and the local network interface unit 250.

The data processor 210 executes a software program that is commonly called a management agent 212 that performs various management functions for the local area network to which the network edge device 200 is connected. Other industry-standard names exist for this function depending upon the management method, so the name "management agent" should be broadly interpreted for the purpose of this description. The management agent 212 handles the management information database (MIB) for the local area network in order to keep track of the status (lower power state, normal operating state, etc.) of the terminal devices on the local area network. The management agent 212 translates commands, such as a network wake-up command, received from the wide area network into appropriate commands to be directed via the local area network to a terminal device. In addition, the management agent 212 contains logic similar to that of the operational address control process 400 in order to enable the network edge device 200 to derive the locally administered destination MAC address for a terminal device, e.g., for terminal device 100, from the global destination MAC address for that terminal device. Thus, the management agent 200 manages the information that tracks the status of each terminal device and accordingly the operational MAC address for each terminal device at any point in time. The management agent 200 may manage message passing as part of an overall management architecture such as Simple Network Management Protocol (SNMP) or the CPE WAN Management Protocol (CWMP or more commonly known as TR-069).

Figure 4:
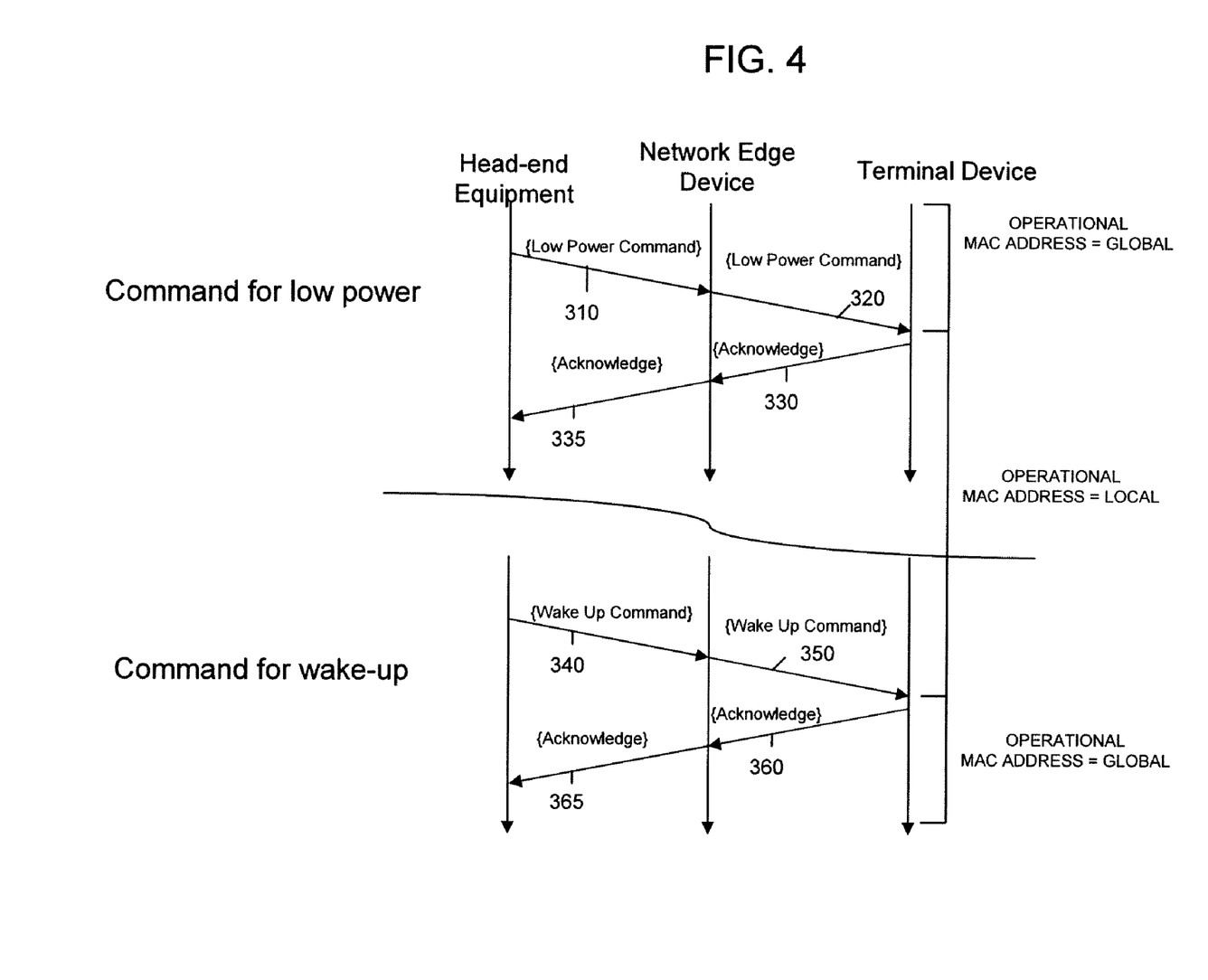
FIG. 4 is a ladder diagram that depicts the general flow of a network-based low-power command and a network-based wake-up command with respect to the terminal device.

Turning now to FIG. 4, a ladder diagram that depicts an example of an overall flow of the network-based wake-up techniques is described. In this example, the event that causes the terminal device to go into the low power state is a network-based command that originates at the headend equipment 300. It is to be understood that there are other events that may cause the terminal device to go into the low power state. Assuming that the terminal device is in a normal operating state, the operational MAC address for the terminal device is the global destination MAC address for the terminal device (Operational MAC Address=Global). At 310, the headend equipment 300 sends a network-based low power command using a management protocol such as SNMP or TR-069 (referred to above) that is addressed to the network edge device 200 via the wide area network 30. The network edge device 200 receives the low power command, and the management agent 212 produces a message to the terminal device 100 at 320 via the local network 20, using a packet like packet 50 shown in FIG. 1. The terminal device 100 receives the low power command produced by the network edge device 200. In response to receiving the low power command, the terminal device 100 enters the low power state and configures the local network controller to respond only to network traffic sent to the locally administered destination MAC address, indicated in FIG. 4 as Operational MAC Address=Local. At 330, the terminal device sends a message addressed to the network edge device 200 that acknowledges receipt of the low power command and indicates that the terminal device 100 is now in the low power state and thus will only respond to network traffic that is addressed to the locally administered destination MAC address. The management agent 212 in the network edge device 200 stores the new status of the terminal device. At 335, the management agent in the network edge device may produce an acknowledgment message to the headend equipment 300. The network edge device 200 now knows that the terminal device 100 switched its operational MAC address to the locally administered MAC address and therefore needs to use the locally administered MAC address in a command to the terminal device 100 to wake-it up for any necessary function, e.g., administrative and management.

The network-based wake-up of the terminal device 100 thus begins at 340 when the headend equipment 300 sends a wake-up command that is addressed to the network edge device 200. The network edge device 200 receives the wake-up command, determines for which terminal device in the local area network it is intended and at 350 produces a wake-up command message (packet) to the appropriate terminal device, e.g., terminal device 100. Since the address field for the packet of the wake-up command sent by the network edge device 200 contains the locally administered destination MAC address, the local network controller in the terminal device 100 will respond to it and pass the command with an appropriate interrupt to the processor in the terminal device 100, causing the terminal device 100 to wake-up from the low power state to the normal operating state. The terminal device 100 transmits an acknowledgment message at 360 and at 365 the network edge device 200 may produce an acknowledgment message to the headend equipment 300. The network edge device 200 knows that the terminal device 100 is in a normal operating state and can communicate with it using the global destination MAC address. Once awakened by the wake-up command, the terminal device 100 sets the operational MAC address for the local network controller back to the global destination MAC address.

The operational address control process 400 that the processor 110 executes in the terminal device is now described with reference to the state diagram shown in FIG. 5, with continued reference to FIG. 2. While FIG. 2 shows that the process 400 may be implemented by software instructions stored (encoded) in the processor readable memory 112, there are other possible implementations. For example, the process 400 may be implemented by fixed logic in the form of firmware for a digital signal processor, or by fixed logic in the form of an application specific integrated circuit (ASIC), or other fixed or programmable digital logic gates or processing logic. In general, the term logic is meant to include both programmable logic such as software executed by the processor 110 as well as fixed logic in hardware form, e.g., an ASIC.

Figure 5:
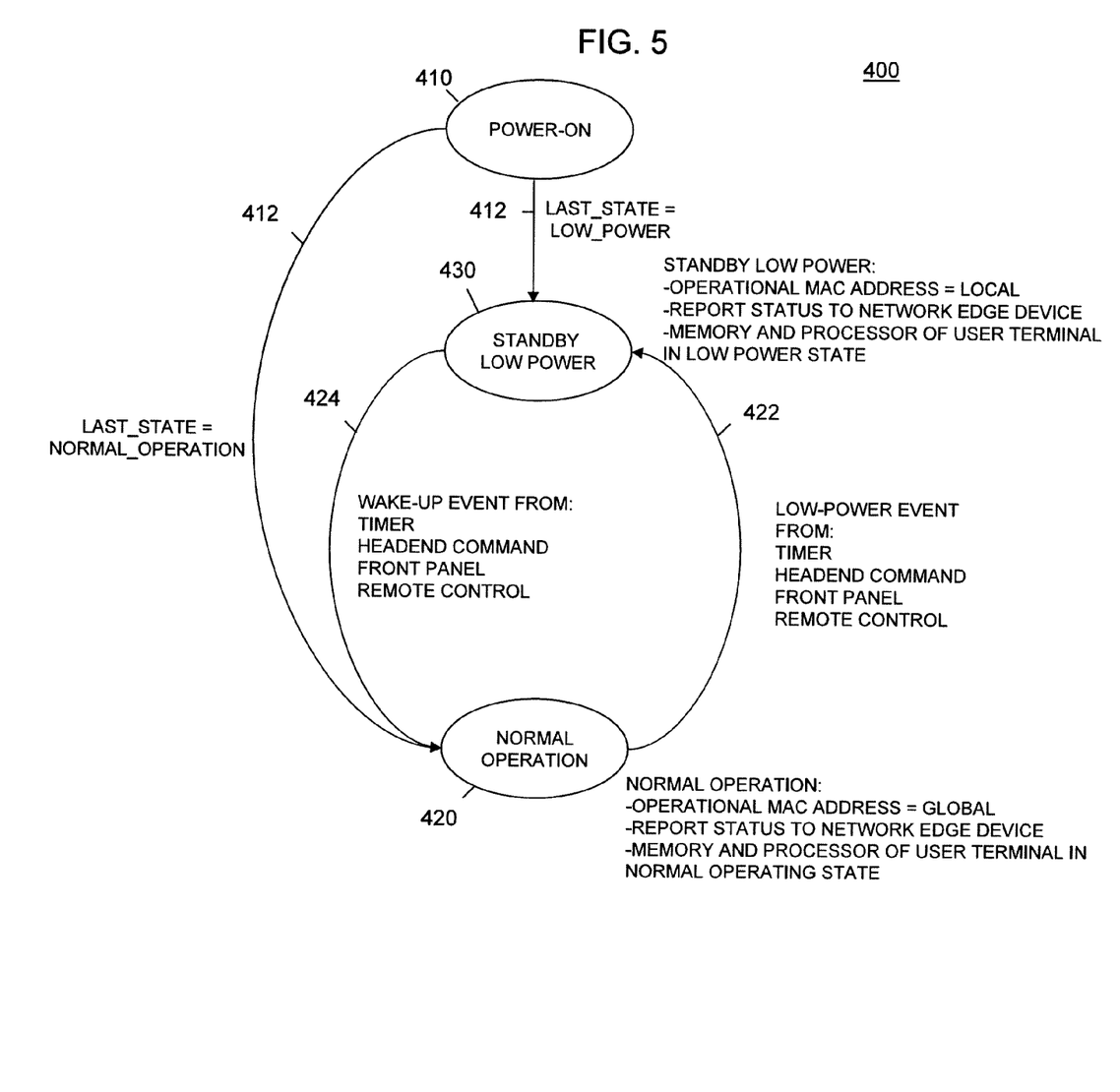
FIG. 5 illustrates a state diagram that depicts the operational MAC address control process executed in the terminal device to support network-based wake-up capabilities.

FIG. 5 shows that there are essentially three states involved where state 410 is a power-on state, state 420 is a normal operating state and state 430 is a standby low power state. The processor 110 in the terminal device 100 continually monitors an operating state of the terminal device, and the processor configures the operational MAC address of the local network controller 120 depending on the operating state of the terminal device, and more particularly in response to transitions between operating states. The power-on state 410 is entered when the terminal device 100 is powered up, and then transitions to either the normal operation state 420 or the standby low power state 430 depending on what the last state of the terminal device was before it was powered down. This is not the only way to implement the power on logic. For example, another way would be to have the terminal device go directly to the normal operating state regardless of the state before power down. When the last state prior to power down was the normal operation state, the transition 412 is made from the power-on state 410 to the normal operating state 420. When the last state prior to power down was the standby low power state, the transition 414 is made to the standby low power state 430.

When in the normal operation state 420, the processor 110 configures the operational MAC address to be the global destination MAC address. In the normal operation state, the processor 110 and any external memory 114 in the terminal device are in a normal operating state and fully responsive to any and all interrupts and functions. The processor 110 transitions to the standby low power state at 422 in response to a low power event, such as expiration of an activity timer, a headend low power command, front panel button presses on the terminal device, or a command from a hand-held remote control unit associated with the terminal device. Immediately prior to entering the standby low power state, the processor 110 configures the operational MAC address of the local network controller 120 to be the locally administered destination MAC address so that the terminal device stops responding to packets sent to its global MAC address and also stops responding to all broadcast traffic. At this time, the processor 120 and external memory 114 are put into a low power state in the terminal device.

A transition from the low power state 430 to the normal operation state 420 occurs at 424 in response to a wake-up event, which includes standard wake-up events at the terminal device such as front panel button presses, a remote control command, timer-based wake-up, etc., as well as a network-based wake-up command from the network edge device 200 that is addressed to the locally administered destination MAC address as described above. When the operating state switches from the low power state 430 to the normal operation state 420, the processor 110 configures the operational MAC address of the local network controller 120 back to the global destination MAC address and the processor 110 wakes-up all relevant normal operating functions of the terminal device.

FIG. 5 shows that the terminal device sends a status message to the network edge device 200 when it switches from the standby low power state to the normal operation state, or vice versa. This allows the network edge device 200 to know the operating state of the terminal device 100 as well as which MAC address to use in order to communicate with the terminal device 100 with network packets over the local area network.

There are numerous advantages of the techniques described herein over existing network-based wake-up schemes. Existing network-based wake-up schemes require a specialized hardware block in the network controller to look for a special packet of a defined format. The techniques described herein do not require any special hardware in the network controller and can therefore be implemented with any off-the-shelf network controller, which consequently have a lower (procurement and use) cost than those network controllers that have the specialized hardware block referred to above.

Furthermore, existing network-based wake-up techniques require a specific packet format beyond the packet header. That is, the packet requires a reserved header and a specialized payload containing the MAC address for the target device. By contrast, the techniques described herein require only the locally administered MAC address in the destination address field of a packet in order to wake the target terminal device. The payload of the packet can be used for any number of functions, including administrative functions, thus allowing for a wake-up and administrative commands to be combined into a single packet. This makes for a more efficient and more appropriate network-based wake-up solution for a video service management system.

Further still, the network-based wake-up techniques described herein achieve maximum power savings because the processor does not need to be pulled out of a low power state along with the external memory in order to examine a received network packet. Rather, the network controller in the terminal device is configured to stop all network traffic until the correct wake-up packet is received.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
generating a predetermined locally administered destination media access control (MAC) address from a global destination MAC address;
configuring, in response to a low power event, a destination MAC address for network traffic that a network controller in a terminal device is responsive to from the global destination MAC address to the predetermined locally administered destination MAC address; and
entering a low power state for the terminal device in response to the low power event.

2. The method of claim 1, and further comprising in response to a network packet received by the network controller that is addressed to the predetermined locally administered destination MAC address, switching an operating state of the terminal device from the low power state to another operating state.

3. The method of claim 1, and further comprising the network controller not responding to broadcast packets addressed to a local broadcast domain associated with the terminal device in the low power state.

4. The method of claim 1, wherein generating the locally administered MAC address comprises setting at least one bit in a field of the global destination MAC address to a predetermined value.

5. The method of claim 1, and further comprising receiving a network packet comprising a low power command that corresponds to the low power event.

6. The method of claim 2, wherein switching the operating state comprises switching the operating state from the low power operating state to a normal operation state.

7. The method of claim 6, wherein switching the operating state is responsive to a packet addressed to the predetermined locally administered MAC address that is received via a local area network.

8. The method of claim 2, and further comprising transmitting a message indicating a change in status of the terminal device.

9. An apparatus comprising:
a network controller that is configured to receive packets sent via a network and to respond to the packets depending on a destination media access control (MAC) address contained in the packets; and
a processor coupled to the network controller, wherein the processor is configured to:
generate a predetermined locally administered destination MAC address from a global destination MAC address, and
configure an operational MAC address for network traffic that the network controller is responsive to based on an operating state.

10. The apparatus of claim 9, wherein the processor configures the operational MAC address to be the global destination MAC address when in a normal operating state and to be the predetermined locally administered destination MAC address when in a low power state.

11. The apparatus of claim 9, wherein the processor is configured to generate the locally administered MAC address by setting at least one bit in a field of the global destination MAC address to a predetermined value.

12. The apparatus of claim 10, wherein the processor enters the low power state in response to a low power event, and wherein the network controller is not responsive to packets addressed to the global destination MAC address or broadcast MAC address during the lower power state.

13. The apparatus of claim 12, wherein in the low power state the network controller is responsive to a received network packet that is addressed to the predetermined locally administered destination MAC address to send an interrupt to the processor that causes the processor to switch from the low power state to the normal operating state.

14. The apparatus of claim 12, wherein the processor is configured to respond to a network packet comprising a low power command that corresponds to the low power event.

15. Logic stored on a computer readable storage media for execution and when executed operable to:
monitor an operating state of a terminal device;
generate a predetermined locally administered destination media access control (MAC) address from a global destination MAC address; and
configure an operational MAC address for network traffic that a network controller is responsive to based on the operating state of the terminal device, wherein the network controller will not respond to the network traffic when the operational MAC address is the predetermined locally administered destination MAC address.

16. The logic of claim 15, wherein the logic that configures comprises logic that configures the destination MAC address to be the global destination MAC address when in a normal operating state and to be the predetermined locally administered destination MAC address when in a low power state.

17. The logic of claim 15, and further comprising logic that generates the locally administered MAC address by setting at least one bit in a field of the global destination MAC address to a predetermined value.

18. The logic of claim 16, and further comprising logic that switches the operating state from the normal operating state to the low power operating state in response to a low power event, and such that the network controller is responsive only to packets addressed to the predetermined locally administered destination MAC address when in the low power state.

19. The logic of claim 18, and further comprising logic that is responsive to reception of a network packet that is addressed to the predetermined locally administered destination MAC address to switch from the low power state to the normal operating state.

20. The logic of claim 18, and further comprising logic that is responsive to reception of a network packet that comprises a low power command that corresponds to the low power event.

* * * * *